March 17, 1964  H. BLACK  3,124,882
BORE HOLE INCLINATION RECORDER
Filed Sept. 6, 1962  2 Sheets-Sheet 1

HAROLD BLACK
INVENTOR.

BY *Herbert J. Brown*

ATTORNEY

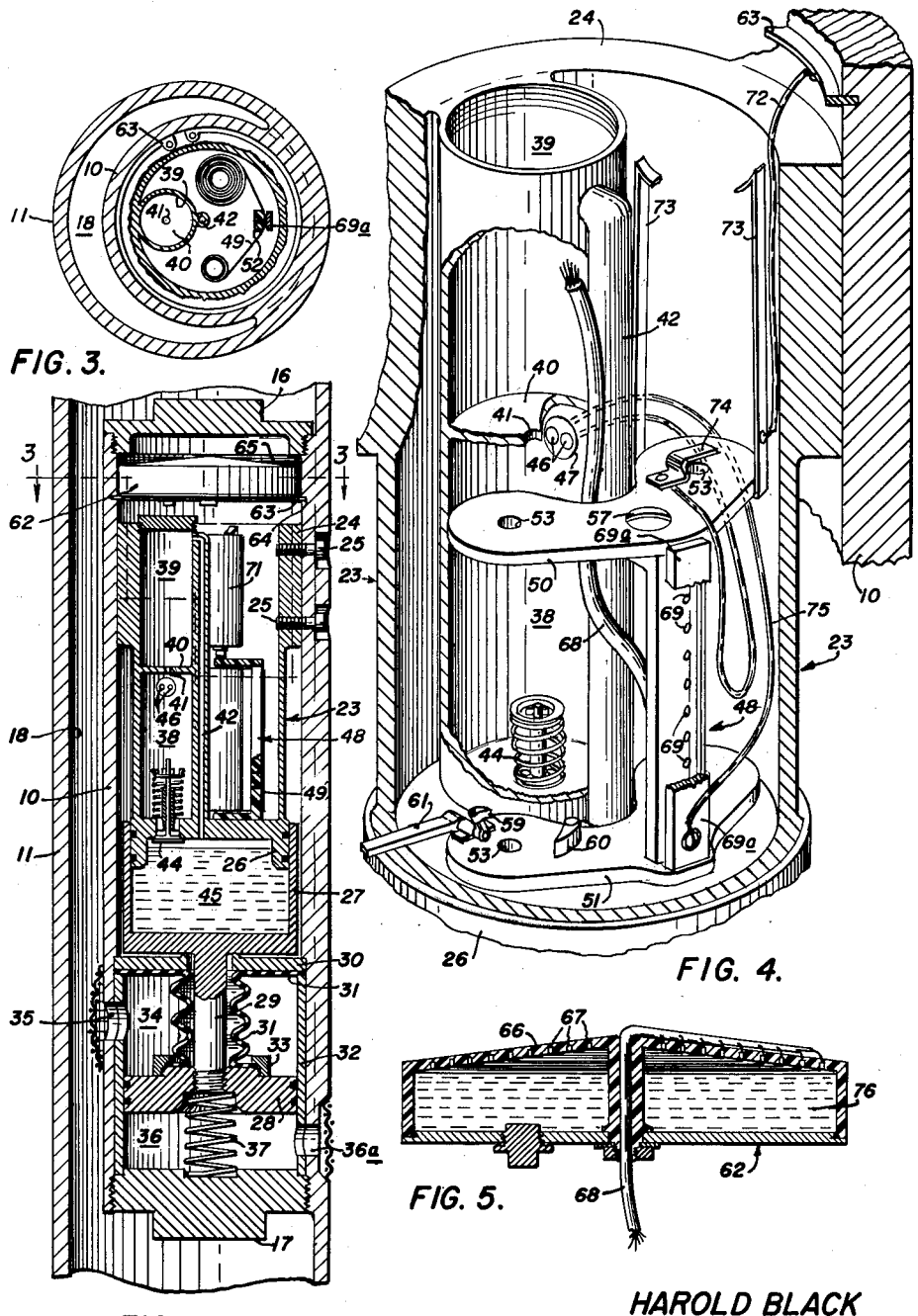

United States Patent Office 3,124,882
Patented Mar. 17, 1964

3,124,882
BORE HOLE INCLINATION RECORDER
Harold Black, P.O. Box 5053, Abilene, Tex.
Filed Sept. 6, 1962, Ser. No. 221,825
3 Claims. (Cl. 33—205.5)

This invention relates to instruments for reading and recording the inclination of bore holes such as oil or gas wells and has reference to an instrument which automatically records the degree of inclination at any selected depth during the drilling operation.

An object of the invention is to provide a sensitive and accurate recording instrument which is rugged enough to withstand shock and vibration close to the bit at the bottom of the hole.

Another object of the invention is to provide an instrument which will selectively read and record the inclination of a bore hole and will also provide a permanent record of such readings.

Another object of the invention is to provide an instrument which is hermetically sealed within a drill collar or the like, and is thus protected from damage from drilling mud or other fluids.

A further object is to provide a self contained hole inclination measuring instrument which requires no wiring or other special communication to the surface.

A further object is to provide an instrument of the described class which is easily accessible after the drill string is withdrawn from the hole.

Other objects and advantages of the invention will become apparent from the following description and accompanying drawing, in which:

FIGURE 2 is a vertical section through the instrument capsule within a fragmentary section of the drill collar.

FIGURE 3 is a cross section taken along line 3—3 of FIGURE 2.

FIGURE 4 is a cutaway perspective showing details of the interior of the capsule.

FIGURE 5 is a vertical cross section of the mercury switch used in the instrument.

Figures 1, 6, 7:
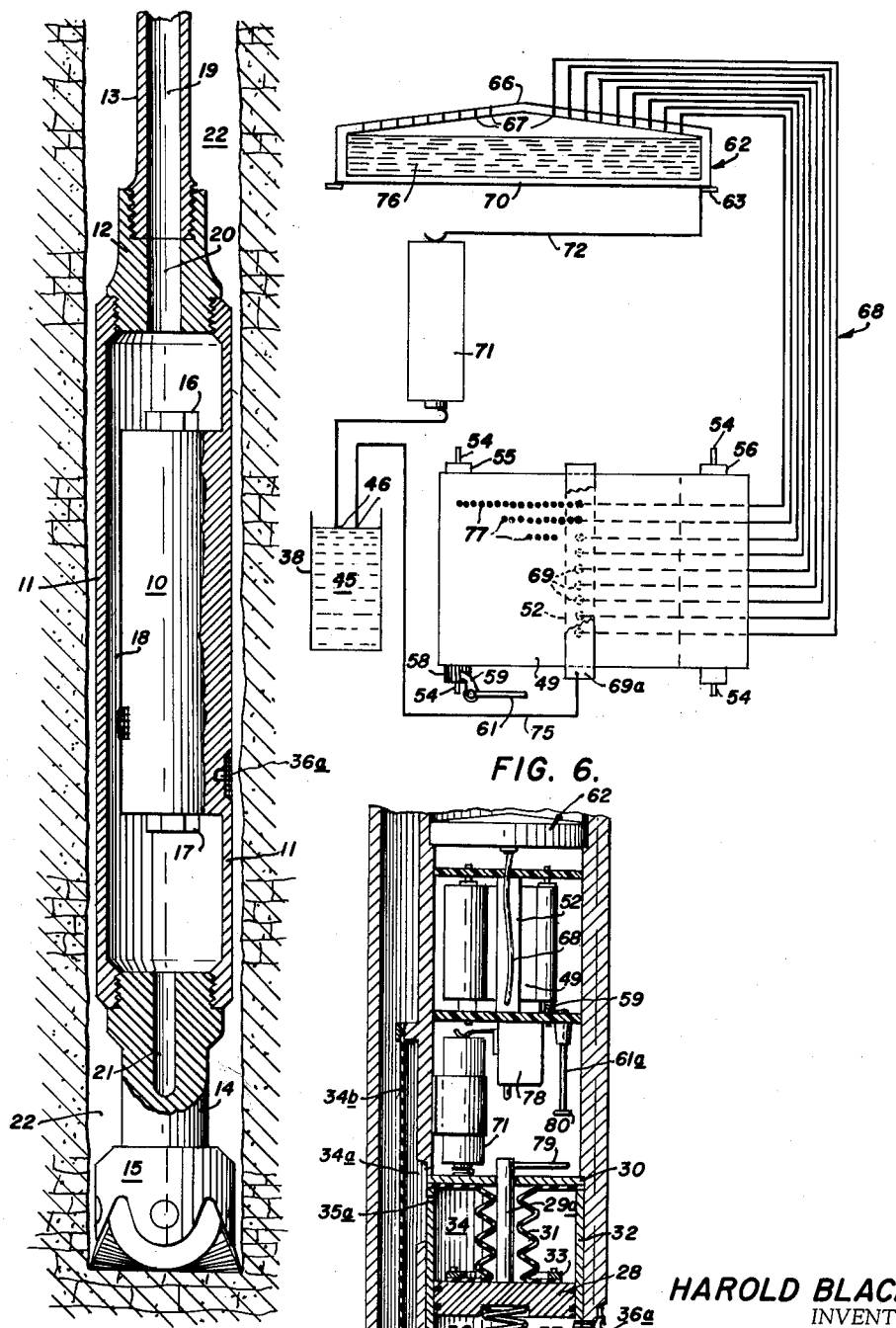
FIGURE 1 is a partially sectional view of a special drill collar or outer casing containing the present instrument and located near the bottom of a bore hole.
FIGURE 6 is a wiring diagram of the electrical circuit used in the instrument.
FIGURE 7 is a vertical section of a modified form of the invention.

Generally, the purpose of this invention is to provide means of printing a dot on a piece of electro-sensitive graph paper each time the drill is brought to a complete stop. The vertical position of the dot indicates the degree of inclination of the instrument at the time, which accurately reflects the inclination of the hole, while the horizontal position of the dot indicates which one of a series of stops the reading represents. When this graph is interpreted in the light of the drilling record made above ground, the exact depth at which the reading was taken can be determined.

The instrument is encased in a cylindrical capsule 10 which is welded or otherwise positioned inside of an outer casing 11, which is screwed at its upper end to a sub 12 and whereby it is connected to the drill pipe 13. At its lower end, the drill collar is screwed to a sub 14 and a roller rock bit 15, as shown, or to whatever other type of bit, not shown, may be used in the drilling operation.

The capsule 10 is closed at its upper and lower ends by screw plugs 16 and 17. For convenience of construction, the capsule may be located asymmetrically within the casing 11. A bypass 18 is necessary for the drilling fluid which is forced under high pressure down the fluid passage 19 of the drill pipe 13, through the center passage of the sub 12, and out through a passage 21 through the sub 14 to the drill bit 15 where it returns to the surface through the bore hole 22. While the drill is operating, there is a pressure differential between the fluid in the bypass 18 and that in the bore hole 22, which pressure differential is important to the functioning of the instrument as hereinafter explained.

The working parts of the instruments are encased in a shell 23 (FIGURE 2) somewhat smaller in diameter than the inside diameter of the capsule 10, except at its upper end which fits snugly in the upper end of the capsule and is attached thereto by cap screws 25, the heads of which are recessed in the outer surface of the outer casing 11.

The lower portion of the shell 23 is formed into a piston 26 fitting into a cylinder 27 which is free to move vertically within the capsule 10 and which is attached to a lower second piston 28 by means of a stem 29. A positioning plate 30 limits the downward motion of the cylinder 27 and also acts as a retainer for the flanged upper end of an accordion tube 31 which is held in place at its upper end by a liner 32, which liner fits the lower piston 28 and is under pressure from the lower screw plug 17. The lower end of the accordion tube 31 is flanged where it is attached to the piston 28 by a retainer ring 33. Thus, the space inside the capsule above the plate 30 is hermetically sealed from the area 34 above the piston 28, which area is filled with drilling fluid which enters from the bypass 18 through a screened port 35 provided for that purpose. The area 36 below the piston 28 is filled with drilling fluid from the bore hole 22 and enters through a screened port 36a.

FIGURE 2 illustrates the position of the parts within the capsule 10 while the drill is in operation. The pressure of the drilling fluid in the bypass 18, and hence the area 34 above the piston 28, is greater than the pressure of the fluid in the bore hole 22 and hence the area 36 beneath the piston. A compression spring 37 between the lower screw plug 17 and the piston 28 would normally force the piston 28 and cylinder 27 upwards to overcome this pressure difference and, therefore, the cylinder 27 rests against the diaphragm plate 30 during the drilling operation.

The shell 23 contains a pair of superimposed chambers 38 and 39 separated by a baffle 40 having a small orifice 41. A duct 42 runs from the space under the upper piston 26 to the upper portion of the upper chamber 39, the latter being closed at the top with a screw cap 43. At the bottom of the lower chamber 38 there is a lightly sprung check valve 44 which allows flow downward only into the space below the piston 26 which is the interior of the cylinder 27. This space, when fully expanded is filled with mercury in a quantity sufficient to completely fill the upper chamber 39 plus the duct 42 when expelled by the upward motion of the cylinder 27 under the thrust of the spring 37. When the drilling is stopped the fluid pressures in the spaces 34 and 36 above and below the lower piston 28 become substantially equal, allowing the spring 37 to expand and force the mercury 45 into the upper chamber 39. The chamber 39 immediately starts draining through the orifice 41 into the lower chamber 38 where it is retained by the check valve 44 held closed by its spring and the pressure of the remaining mercury in the cylinder 27. A pair of contact points 46 in an insulated plug 47 are located near the top of the chamber 38 and when the mercury 45 reaches the level of these points a circuit is completed which has to do with making a record of the inclination of the bore hole at that precise moment. When drilling is resumed the cylinder 27 starts down and the mercury 45 drains out through the check valve 44, breaking the circuit at contact points 41.

The remaining space within the cell 23 contains a holder 48 for a roll of electro-sensitive or heat sensitive paper 49, which holder includes an upper plate 50 and a lower plate 51 separated by an upright printing bar 52, all of dielectric material. The plates 50 and 51 are provided with bearings 53 to receive the ends of the axles 54 of the rollers 55 and 56 carrying the paper 49. By removing a screw 57, the upper plate 50 can be lifted to insert or remove the roll of paper. The leading roller 55 has a ratchet wheel 58 (shown only in FIGURE 6) which engages a ratchet 59 and a pawl 60 mounted on the lower plate 51. The ratchet 59 has a lever extension 61 which intercepts the edge of the cylinder 27 each time it rises in the previously described cycle, advancing the electro-sensitive paper 49 a measured interval.

The inclination of the drill collar, and thereby the inclination of the bore hole, is measured by a disc shaped mercury switch 62, operating as a level, which is clamped in the top of the capsule 10 against a snap ring 63 in an annular groove 64. A large diameter helical spring 65 under the screw cap 16 holds the switch 62 firmly in place. The top surface 66 of the switch 62 is conical and is made of dielectric material. In the top surface 66 are embedded equally spaced concentric conductive rings 67 which are wired consecutively through an insulated cable 68 to exposed contact points 69 spaced in a straight line along the printing bar 52 where each point 69, if charged with an electric current, will leave a mark on the electro-sensitive paper 49. A conductor bar 69a stands vertically opposite the printing bar 52 to create a potential across the separating space between them through which the electro-sensitive paper 49 is threaded.

The base 70 of the switch 62 is conductive and is connected to a battery 71 through a wire 72 from the snap ring 63 to a battery clip 73. The opposite pole of the battery 71 bears on a clip 74 which is wired to one of the contact points 46 in the chamber 38. The other point 46 is connected to the conductor bar 69a by a wire 75 completing a circuit across the electro-sensitive paper 49. If the mercury switch 62 is inclined when the drilling operation is stopped and the mercury piston cycle begins, one or more of the concentric rings 67 will come in contact with the mercury 76 in the switch, thus charging one or more of the contact points 69 in the printing bar 52. When the cycle closes the circuit through contact points 46 a mark will be made on the electro-sensitive paper by each of the points 69 corresponding to a ring 67 that touches the mercury 76. This gives a reading on the paper 49 composed of a series of dots 77 as shown in FIGURE 6. The delay in filling the lower chamber 38 with the mercury 45 after stopping the drill allows the mercury 76 in the switch 62 to settle down and all vibration to cease before a reading is recorded and whereby the measure of inclination will be accurate. By comparing the pattern of the dots 77 with the drilling record an accurate picture of the well can be constructed and remedial measures can be taken when necessary.

A different embodiment of the invention is illustrated in FIGURE 7 in which the lower piston 28 is provided with a stem 29a which is forced upward by the spring 37 when the fluid pressures in the upper space 34 and the lower space 36 are equalized. The pressure in the upper space 34 is maintained by oil which fills that space and a connecting cell 34a sealed off from the bypass 18 by a diaphragm 34b but subject to the pressure therein. The end of the stem 29a comes in contact with a limit switch 78 which completes the electrical circuit through the battery 71, the switch 62 and the printing bar 52 thus imprinting the dots 77 on the electro-sensitive paper 49 as previously described. The time lag required to allow the mercury 76 in the switch 62 to subside is accomplished by limiting the size of the port 35a leading to the space 34 above the piston 28 from the cell 34a, thus delaying the escape of oil from the space 34 after the drill has been stopped. The limit switch 78 is of the type to remain closed only momentarily even if contact with the stem 29a is prolonged. A side arm 79 on the stem 29a actuates a push rod 80 which in turn actuates the ratchet 59 to advance the paper 49 for each reading of the instrument.

The invention could be further simplified by allowing the drilling fluid in the bypass 18 to operate directly as a pressure medium in the upper space 34, except that the metering function of the aperture 35a is difficult to maintain under the varying viscosity of the drilling fluid and there is danger of such a small opening becoming completely clogged by the suspended solids in the drilling fluid.

The invention is not limited to the exemplary construction herein shown and described, but may be made in various ways within the scope of the appended claims.

What is claimed is:

1. A bore hole inclination recorder for use in a drill string, said recorder comprising:
   a sealed capsule within said drill string,
   an inclination responsive switch within said capsule, said switch having multiple contacts and means closing one or more of said contacts according to the inclination thereof,
   a printing bar within said capsule, said printing bar having multiple spaced contacts on its surface,
   an electrical circuit individually connecting the contacts of said switch with the contacts of said printing bar and with a power source,
   a normally open switch in said electrical circuit,
   a movable sheet of electro-sensitive material adjacent the contacts of said printing bar,
   piston means exposed on one end to pressure from drilling fluid,
   pressure means applied to said piston in a direction opposite that applied by said drilling fluid,
   means operated by said piston opening and closing said normally open switch, and
   means operated by said piston moving said sheet of electro-sensitive material relative to the contacts on said printing bar.

2. A bore hole inclination recording instrument comprising:
   a cylindrical capsule within a drill collar and having flow space at least partially therearound and being divided by a transverse plate into two compartments, the first of said compartments containing:
   a mercury switch of the type wired to transmit a series of electrical signals progressively in proportion to the degree of inclination,
   a roll of electro-sensitive paper and mounting means therefor,
   a printing bar transversely adjacent the surface of said paper and having therein separately spaced and aligned contact points connected respectively to the output stages of said switch,
   an electrical circuit including a battery in series with said switch and said printing bar,
   a normally open switch in said electrical circuit;
   the second of said compartments containing:
   a piston fitting the inside diameter of said capsule,
   a piston rod mounted on said piston and projecting through said transverse plate,
   a spring within said capsule in contact with and positioned to force said piston toward said transverse plate,
   a port leading from the flow space around said capsule to the space between said piston and said transverse plate,
   a second port leading from the outside of said drill collar to the space between the piston and the end of said capsule,
   an actuator coactive with said switch and operatively connected with said piston rod, and
   ratchet means attached to said mounting means of said electro-sensitive paper and including linkage extending therefrom and coactively connected with said piston rod.

3. A bore hole inclination recorder comprising:

a cylindrical capsule within a drill collar with flow space at least partly therearound, a cylindrical cell rigidly contained within the upper end of said capsule with one free depending end of lesser diameter than the inside of said capsule, said depending end comprising a piston, a hollow cylinder engaging said piston and having a depending stem connecting with a second piston fitting the inside diameter of said capsule, said stem projecting through a transverse plate dividing said capsule into upper and lower sections, a spring forcing said second piston toward said transverse plate, a first port leading from the space between said second piston and said plate to the flow space outwardly of said capsule, a second port leading from the space below said second piston to the outside of said drill collar, two chambers superimposed one above the other directly above said first depending piston and partly filling said cell and a duct leading from below said first piston to the upper end of said upper chamber, a check valve between said lower chamber and the space below said first piston, mercury substantially filling the capacity of the cylinder coacting with said first piston, a strip of electro-sensitive paper mounted on rolls within said cell, a printing bar set between said rolls and contacting said paper, said printing bar having aligned and separate contact points, an electrically sensitive mercury switch mounted within said cell, said mercury switch having multiple contacts in ring form around the upper inner surface thereof, a battery connected to the multiple contacts of said mercury switch and said printing bar, a normally open switch comprising separate contact points positioned to be closed by immersion in mercury and dielectrically mounted near the top inside of said upper chamber and included in the circuit between said battery and said printing bar, and ratchet means coacting one of said paper rolls with said first depending piston for progressively rotating said roll.

No references cited.